June 6, 1967 — C. J. BARECKI — 3,323,835
VEHICLE SEAT
Filed Jan. 14, 1966 — 2 Sheets-Sheet 1

INVENTOR
Chester J. Barecki

WITNESS
Harry S. Brown Jr.

BY Dawson, Tilton, Fallon, Lungmus, and Alexander
ATTORNEY

June 6, 1967 C. J. BARECKI 3,323,835
VEHICLE SEAT
Filed Jan. 14, 1966 2 Sheets-Sheet 2
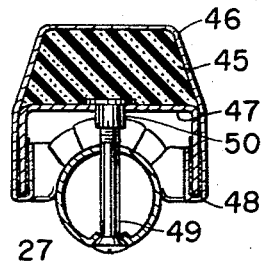
FIG. 5
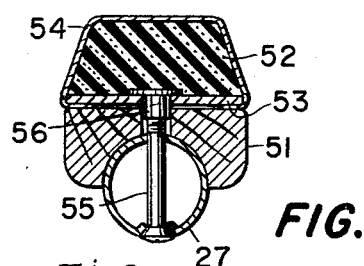
FIG. 6
FIG. 7
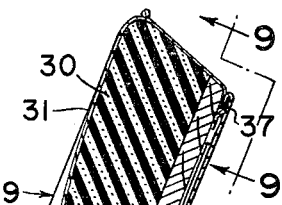
FIG. 9
FIG. 10
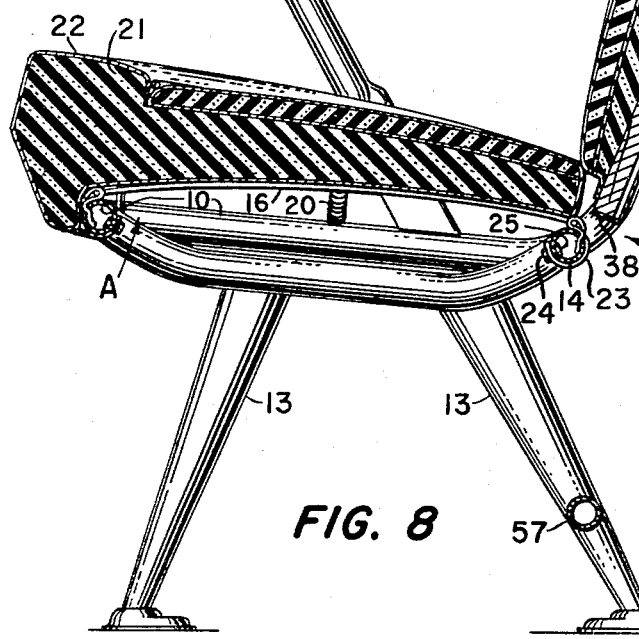
FIG. 8
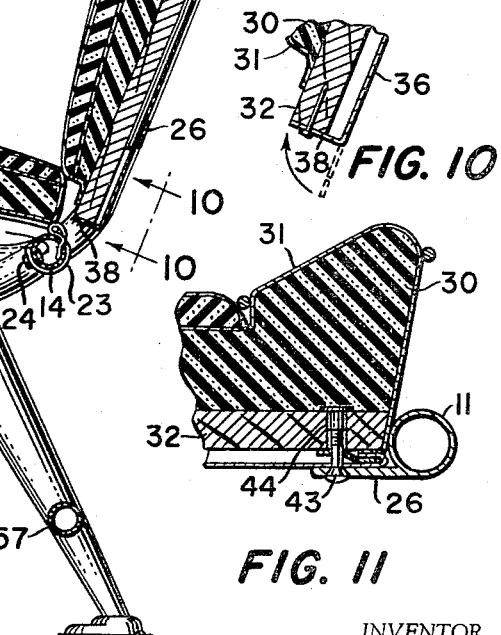
FIG. 11
INVENTOR
Chester J. Barecki
WITNESS
Harry S. Brown Jr.
BY Dawson, Tilton, Fallon,
Lungmus, and Alexander
ATTORNEY

United States Patent Office 3,323,835
Patented June 6, 1967

3,323,835
VEHICLE SEAT
Chester J. Barecki, Grand Rapids, Mich., assignor to American Seating Company, Grand Rapids, Mich., a corporation of New Jersey
Filed Jan. 14, 1966, Ser. No. 520,706
2 Claims. (Cl. 297—445)

This invention relates to a vehicle seat, and the seat is particularly useful for buses and the like.

An object of the invention is to provide a vehicle seat of a new design providing a handrail and safety bar at the rear of the seat and improved seat supporting and anchoring means. Yet another object is to provide a vehicle seat having a frame structure of novel design and providing a spring and seat cooperative structure facilitating the attachment and detachment of seats when the same is desired. Yet another object is to provide in a vehicle seat structure a convex spring-supporting means and a cooperating foam seat having a concave bottom fitting said convex spring structure in combination with a side bar and panel enclosing the space below the concave spring support. Other specific objects and advantages will appear as the specification proceeds.

The invention is shown, in an illustrative embodiment, by the accompanying drawings, in which—

Figure 1:
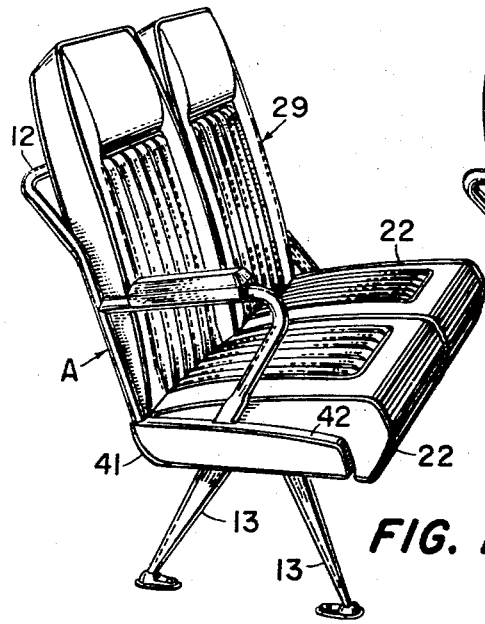
Figure 2:
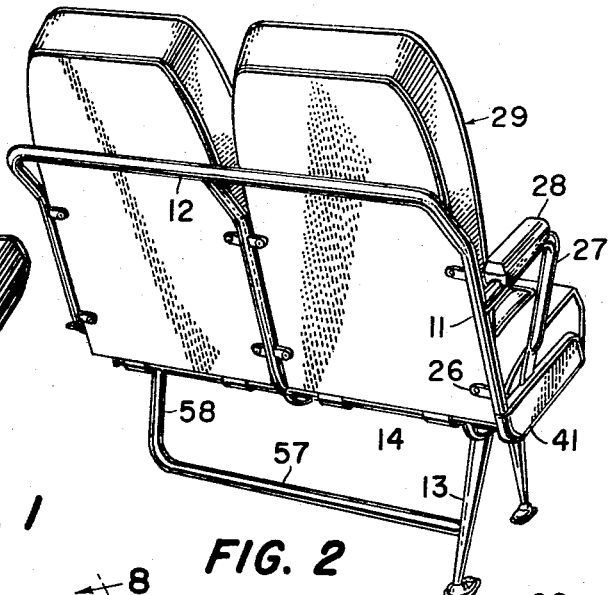
Figures 3, 4:
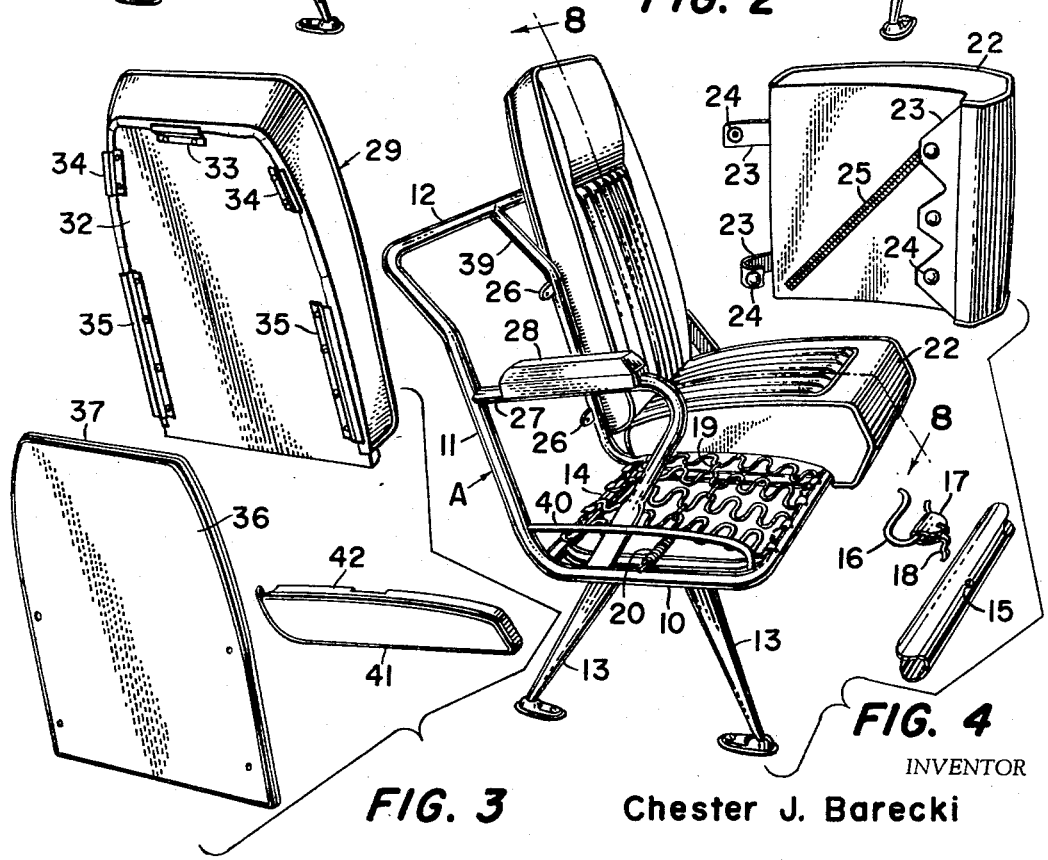

FIG. 1 is a perspective view of a vehicle seat structure embodying my invention; FIG. 2, a perspective view showing the rear portion of the seat; FIG. 3, an exploded view showing the seat frame and parts thereof in separated relation; FIG. 4, a broken perspective view of the tubular frame rail equipped with an attachment opening and a spring clip equipped with an attachment wire; FIG. 5, a transverse sectional view of an arm rest structure, the section being taken as indicated at line 5—5 of FIG. 8; FIG. 6, a transverse sectional view of a modified form of arm rest, the section being taken as indicated at line 6—6 of FIG. 7; FIG. 7, a broken side view in elevation of the modified form of arm rest shown in FIG. 6; FIG. 8, a vertical sectional view, the section being taken as indicated at line 8—8 of FIG. 3; FIG. 9, a detail sectional view, the section being taken as indicated at line 9—9 of FIG. 8; FIG. 10, a detail sectional view, the section being taken as indicated at line 10—10 of FIG. 8; and FIG. 11, an enlarged detail sectional view, the section being taken as indicated at line 11—11 of FIG. 8.

In the illustration given, A designates a tubular frame which is preferably a continuous, one-piece tubular frame or rail forming through a horizontal portion 10 a seat frame and through the vertical portion 11 a chair back portion and through the rearwardly-inclined or canted portion 12 a handrail and stop rail.

The frame rail A is carried by a suitable base which in the illustration given consists of the legs 13 adapted to be secured to the floor of the vehicle. The inner side of the frame A is preferably secured by brackets (not shown) to the side wall of the vehicle.

The horizontal portion 10 of the rail A is equipped at its rear with a tubular stretcher rod 14 so that a perimetric seat frame is thus provided. The rail 14 and the front side of the rail portion 10 are provided with attachment openings or holes 15, as shown best in FIG. 4. Sinuous spring rods 16 are connected to the stretcher 14 and to the front portion of the frame 10 by means of clips 17 provided with depending waved attachment pins 18 which are extended into the openings 15 for securing the clips to the perimetric frame. The loops of the sinuous spring 16 are connected transversely by rings or clips 19, and the spring body on its outermost side is connected by a coil spring 20 to an opening in the side of frame 10, as shown best in FIG. 3.

The spring body formed by the connected sinuous rods 16 is secured to the frame 10 under compression to form an arched or convex spring body. Mating with the convex spring body is a cushion body 21 having a concave lower side and provided with a cover 22 conforming in shape to the cushion body 21. The cover 22 is provided at its front and rear sides with attachment flaps 23 equipped at their ends with snap fasteners 24 adapted to engage fixed snap fasteners 25 carried by the rear stretcher member 14 and by the front portion of frame 10, as shown best in FIG. 8. By providing a convex spring body 16 and a cooperating concave bottom seat, the snap fasteners employed for securing the seat to the frame are readily accessible in such securing operation and are likewise readily accessible for detaching the seat for removal from the frame.

The seat cover 22 is preferably provided with a zip fastener-equipped opening 25 for insertion and removal of the foam insert 21, the opening 25 being shown best in FIG. 3.

The generally vertical portion 11 of the tubular frame A is provided with inwardly-extending attachment lugs 26. On one side of the frame, an arm rest tube 27 extends forwardly and downwardly and is welded to the seat frame 10. An arm rest 28 is mounted on the member 27, as shown best in FIG. 3.

A seat back 29 is formed as shown best in FIGS. 3 and 8. The seat back consists of a foam body 30 enclosed by a cover 31. The foam body, like foam body 21, may be formed of polyester urethane foam, rubber foam, or any other suitable material. The cover 31 is supported by a board member 32 which may be formed of plywood or other suitable material, and the cover is preferably secured by nails or other means to the board 32. At the rear of board 32, as shown best in FIG. 3, are mounted five brackets provided with spaced flanges forming attachment clips. There is one clip member 33 at the top of the board 32, a pair of clip members 34 near the top of the board, and elongated clip members 35 at the bottom of the board. An outer finished panel 36 provided with inwardly-turned flanges 37 is adapted to engage the clips 33, 34 and 35, as shown best in FIG. 8, so as to lock the finished panel 36 over the plywood board 32. The inwardly-turned flange 37 engages the top clip 33, as shown best in FIG. 9, and the inwardly-turned side flanges engage the remaining clips 34 and 35. At the bottom of the finished panel 36 is a flange 38 which is bent inwardly and nailed to the bottom of the board 32, as shown best in FIG. 8 and FIG. 10.

The upper portion 12 of the frame A is canted rearwardly above the attachment members 26 to form a handrail. This handrail is preferably braced at a median point by the vertically-extending tubular member 39, as shown best in FIG. 3. The rail 12 is useful as a garment hanger and with the member 39 forms a rack for packages, etc. The rearwardly-canted rail 12 serves not only as a handrail which is spaced at a distance from the seat member 29, but also it serves as a protective bar in the event that the seat 29 is sprung rearwardly or in case the attachment lugs 26 are bent or deformed rearwardly.

The frame is provided on its outer side with an L-shaped or bowed bar 40, as shown best in FIG. 3, and upon the bar 40 is supported a closure panel 41. The closure panel 41 has inwardly-extending flanges 42 which are secured to the bowed bar 40 and is anchored thereby in position to close the interior of the convex spring frame 16.

In the assembly of the back 29 to the frame portion 11 and fastening brackets 26, attachment screws 43 are passed through the flanges 26 and into T-nuts 44 with which the board 32 is provided, as shown best in FIG. 11.

The arm rest 28 may be of any suitable construction.

In the illustration given best in FIG. 5, a foam rubber 45 is enclosed within a cover 46 over an inwardly-turned steel box 47. The raw edges of the metal box 47 at its lower end are provided with a tape 48 and the cover 46 extends about the tape edges. Two oval head screws 49 extend through the tube 27 and engage a T-nut 50. The foam member 45 is preferably secured by cement to the top side of the box 47. In the modified structure shown in FIG. 6, a block 51 formed of wood or other sutiable material is provided with a concavity fitting the tube 27, and a foam pad 52 is mounted on a plate 53, and a cover 54 extends about the foam 52 and under the plate 53 and is clamped between the plate and the block 51 by the screw 55 engaging the T-nut 56.

A foot rail 57 is provided by a tubular member which is turned upwardly at one end 58 and welded to the stretcher bar 14 and welded at its other end to the base of foot 13, as shown best in FIG. 2.

In the operation of the structure, the seat members 21 having concave lower portions are fitted over the convex sinuous spring body 16, and the flaps 23 are extended about the stretcher bar 14 and the front end of frame 10 to bring the snap fasteners 24 into engagement with the fasteners 25, as shown in FIG. 8. The back 29 is secured by screwing the four screws 43 through the attachment flanges 26 of the frame portions 11 and 39. This leaves the seat backs supported upon the vertical frame portion 11, while the top portion of the frame 12 extends rearwardly behind the seats 29 and spaced therefrom to form handrails and also members limiting rearward movement of the seat 29.

While in the foregoing specifications I have set out specific structures in considerable detail for the purpose of illustrating embodiments of the invention, it will be understood that such details of structure may be varied widely by those skilled in the art without departing from the spirit of my invention.

I claim:
1. In a vehicle seat, a base, a frame rail carried by said base and extending about the front and sides of said base to provide a seat support, a chair seat carried by said frame rail, a chair back also supported by said frame and extending upwardly, said frame rail having its rear sides extended upwardly alongside said chair back, means for securing said chair back upon said upwardly-extending frame rail, said frame rail having a top portion in the shape of an inverted U and inclined rearwardly about halfway of said chair back and above said chair seat to provide a handrail by which an occupant of an adjacent rear seat may lift himself to a standing position.

2. The structure of claim 1 in which a stretcher rod connects the rear portions of said frame rail and in which a pair of seats is supported upon said frame and below said handrail, and in which also a vertical support extends between said handrail and said stretcher rod.

References Cited

UNITED STATES PATENTS

| 2,135,657 | 11/1938 | Church | 297—396 |
| 2,185,758 | 1/1940 | Todd et al. | 297—460 X |
| 2,284,957 | 6/1942 | Gedris | 297—460 X |
| 2,349,092 | 5/1944 | Hammer | 297—219 X |
| 2,495,654 | 1/1950 | Ford | 297—232 |
| 2,728,382 | 12/1955 | Baranski | 297—218 |
| 2,786,513 | 3/1957 | Hoven et al. | 297—444 X |
| 2,845,111 | 7/1958 | Baranski et al. | 297—232 X |
| 3,033,613 | 5/1962 | Dudley | 297—219 |
| 3,037,814 | 6/1962 | Gardner et al. | 297—444 |
| 3,067,475 | 12/1962 | Molla | 24—265.3 |
| 3,120,407 | 2/1964 | Propst | 297—457 |
| 3,134,627 | 5/1964 | Mason | 297—416 |
| 3,139,307 | 6/1964 | Hawley et al. | 297—454 |
| 3,143,339 | 8/1964 | Flint | 267—107 |

FOREIGN PATENTS 464,355   4/1937   Great Britain.

CASMIR A. NUNBERG, *Primary Examiner.*

FRANK B. SHERRY, *Examiner.*